(12) United States Patent
Tönnigs et al.

(10) Patent No.: US 6,607,069 B2
(45) Date of Patent: Aug. 19, 2003

(54) CRANK DRIVE FOR RETURNING WORK PIECES

(75) Inventors: Bodo Tönnigs, Lichtenberg (DE); Dietmar Kaden, Mulda (DE)

(73) Assignee: Ligmatech Automationssysteme GmbH, Lichtenberg (DE)

( * ) Notice: Subject to any disclaimer, the term of this patent is extended or adjusted under 35 U.S.C. 154(b) by 0 days.

(21) Appl. No.: 10/141,172

(22) Filed: May 9, 2002

(65) Prior Publication Data

US 2002/0195312 A1 Dec. 26, 2002

(30) Foreign Application Priority Data

May 9, 2001 (DE) ..................................... 201 07 813 U
Sep. 14, 2001 (EP) ................................................ 01121685

(51) Int. Cl.⁷ ............................................. B65G 29/00
(52) U.S. Cl. ........................ 198/465.1; 198/580; 74/50
(58) Field of Search ........................ 74/50; 198/465.1, 198/463.3, 580

(56) References Cited

U.S. PATENT DOCUMENTS

| | | | | | |
|---|---|---|---|---|---|
| 63,515 | A | * | 4/1867 | Hawk | 366/258 |
| 2,993,582 | A | * | 7/1961 | Souser | 198/463.3 |
| 3,171,554 | A | * | 3/1965 | Ebbert | 414/713 |
| 3,554,358 | A | * | 1/1971 | Turner | 198/434 |
| 4,047,625 | A | * | 9/1977 | Grant | 414/651 |
| 4,284,187 | A | * | 8/1981 | Kramer et al. | 198/435 |
| 4,739,607 | A | * | 4/1988 | Annas et al. | 53/557 |
| 4,867,299 | A | * | 9/1989 | Fukuoka et al. | 198/435 |
| 4,977,999 | A | * | 12/1990 | Smock | 198/463.3 |
| 6,308,496 | B1 | * | 10/2001 | Lee et al. | 53/154 |

FOREIGN PATENT DOCUMENTS

| | | |
|---|---|---|
| DE | 31 01 659 A1 | 8/1982 |
| DE | 40 10 383 A1 | 10/1991 |
| DE | 93 07 220.1 | 10/1992 |
| DE | 200 16 186 U1 | 1/2001 |

* cited by examiner

Primary Examiner—Christopher P. Ellis
Assistant Examiner—Richard Ridley
(74) Attorney, Agent, or Firm—Finnegan, Henderson, Farabow, Garrett & Dunner, L.L.P.

(57) ABSTRACT

The invention relates to a mechanism for returning processed work pieces (7) from the output side to the loading side of a processing unit, which mechanism has a transfer mechanism (1) to transfer the work pieces (7) at the output side of the processing unit, a return mechanism (2) for transporting work pieces (7) delivered by the transfer mechanism (1) back to the loading side of the processing unit or to a further processing unit, and a lifting mechanism to lift the work pieces (7) to a return position located above the output position, whereby the lifting mechanism is located between the transfer mechanism (1) and the return mechanism (2) and has a lifting platform (3), with the lifting mechanism having a crank drive (4), by means of which the lifting platform (3) can be raised and lowered.

16 Claims, 5 Drawing Sheets

Figure 3:
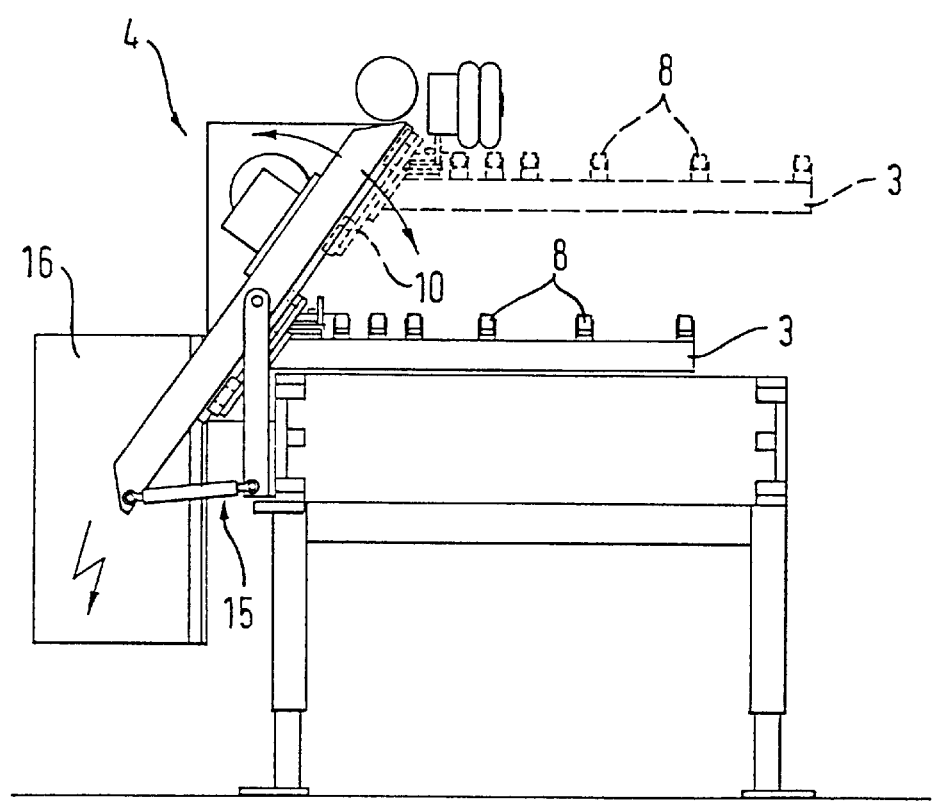

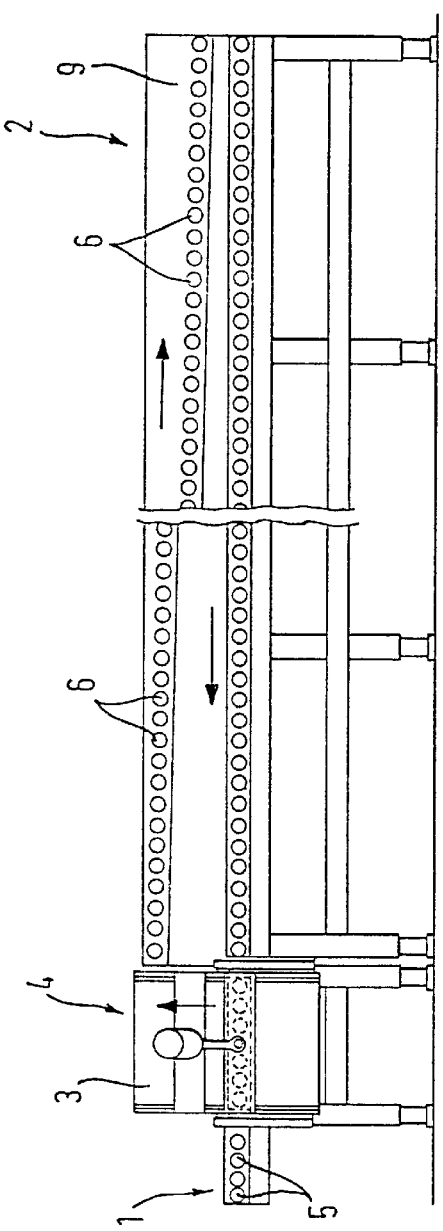
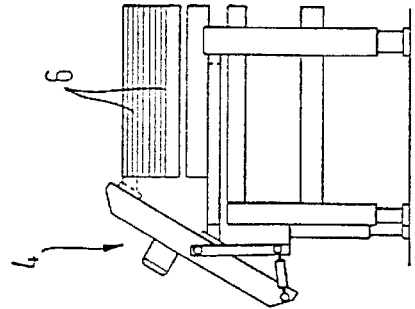

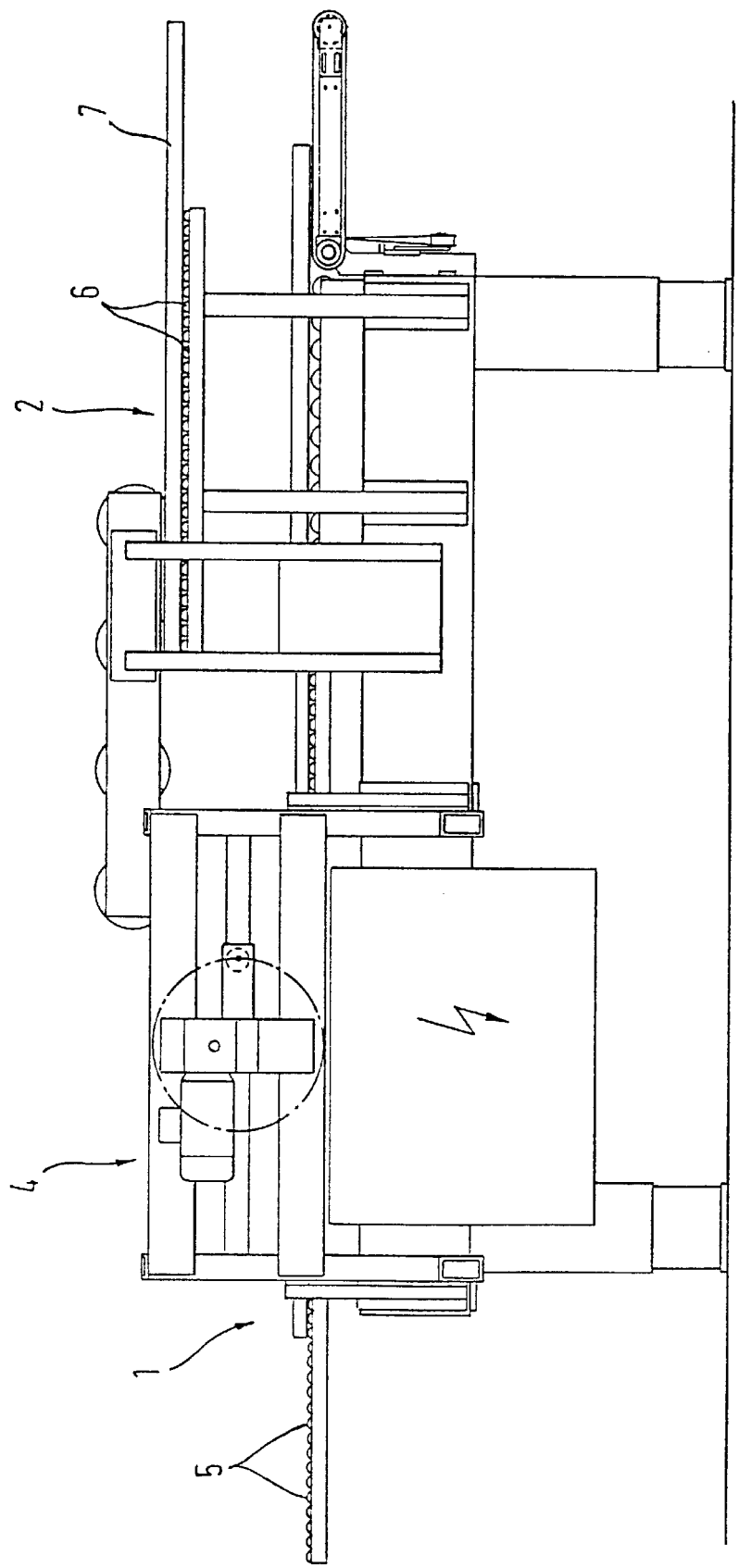

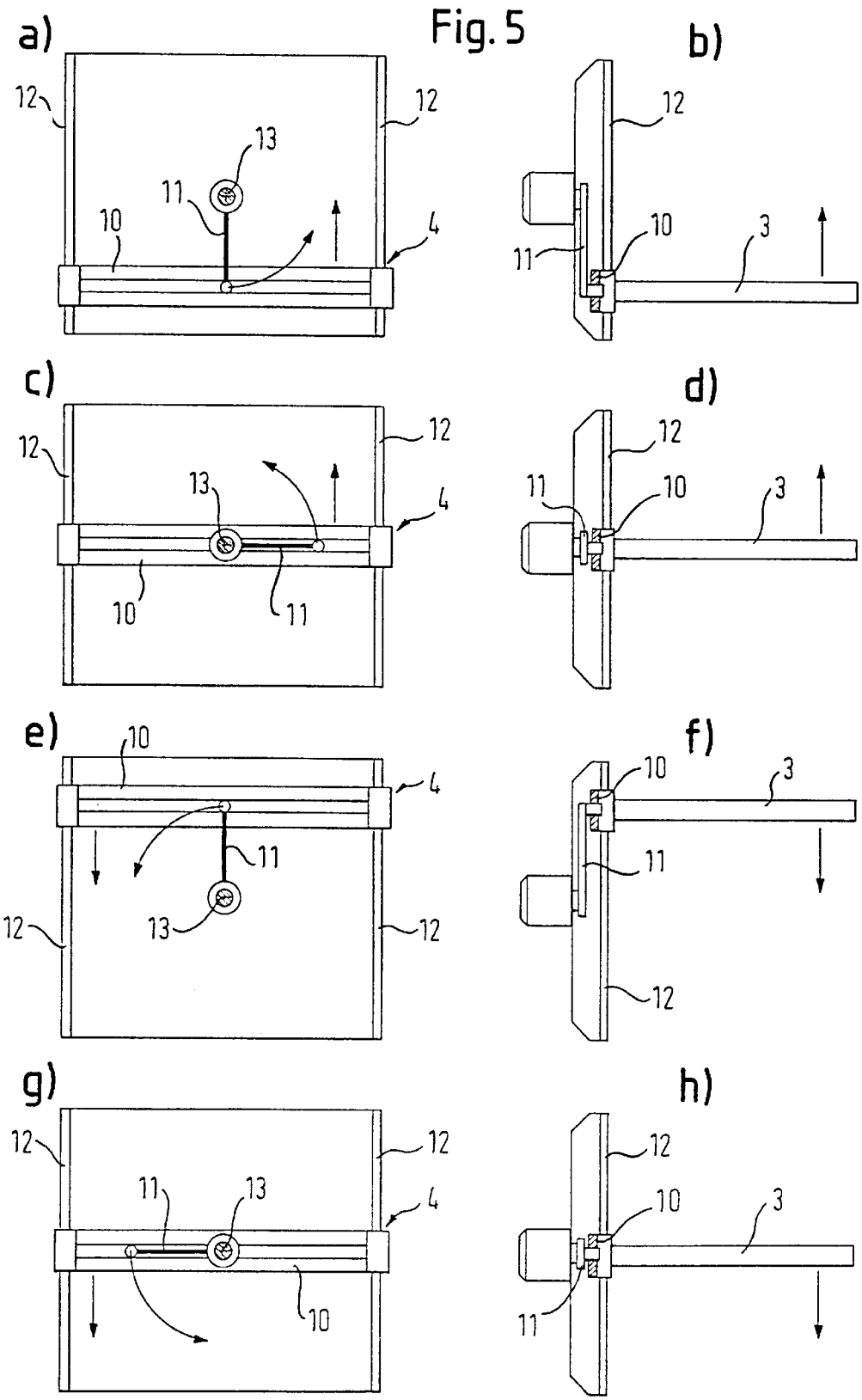

CRANK DRIVE FOR RETURNING WORK PIECES

FIELD OF THE INVENTION

The invention relates to a mechanism for returning processed work pieces from the output side to the loading side of a processing unit. The mechanism has a transfer mechanism to transfer the work pieces at the output side of the processing unit, a return path for transporting work pieces delivered by the transfer mechanism back to the loading side of the processing unit or to a further processing unit, and a lifting mechanism to lift the work pieces to a return position located above the output position, which is located between the transfer mechanism and the return path and has a lifting platform.

When work pieces, in particular in the form of plates, stripes or ridges are processed, which are in particular made of wood, wood-like or synthetic materials, it is often necessary to perform the processing of a work piece on a processing unit several times. In the present case, a processing unit is mainly understood to represent one or a plurality of processing stations or the so-called continuous-flow-type machines. In these continuous-flow-type machines, different processing operations are performed at one lateral edge each of the work piece during one passage.

Such a processing of the lateral edges of a work piece is, for example, necessary for furniture parts or front parts of kitchen units which have to be processed at all four side edges or the edge areas in order to glue, for example, an edge and process the same. Since these machines have in most cases an oblong form, it is necessary to return the work pieces after one or a plurality of process steps to the loading side.

PRIOR ART

The simplest possibility to return the work pieces consists in providing one operator each at both ends of the processing unit, one of them inserting die work pieces to the loading side and the other picking up the processed work pieces at the output side of the processing unit and manually returning them one by one or in batches to the loading side. However, such a procedure is very time- and cost-consuming and prevents an optimum exploitation of the processing unit.

For this reason, different return devices have been developed.

According to a known embodiment, the work pieces are placed onto a roller path guided semi-circularly at the end of the processing unit, which turns the work pieces in the horizontal plane by 180°. The roller path is followed by a return path running in parallel to the processing path and returning back the work pieces to the loading side.

According to German utility model G 200 16 186, instead of the roller path guided semi-circularly, a displacement unit is provided between the processing unit and the return path running beside the processing path: after having been processed in the processing unit, the work pieces are picked up at the output side by driven rollers, and supporting ridges of the displacement unit are passed between these rollers from below to the above lifting the work piece. Thereupon, the supporting ridges are laterally displaced together with the work piece and place the same onto the return path.

Such return devices, in which the return path runs substantially at the same level with the processing path and beside the same, require, on the one hand, a large amount of space alongside the processing machine. On the other hand, the return path becomes very dirty, since finest chips or the like are continuously arising during processing in the wood working industry. Thus, the return path needs a lot of service which is connected with great expenditure.

In order to solve these problems, the return path is arranged above the processing path in the return device according to German utility model G 93 07 220.1, the disclosure of which is herewith completely made subject matter of the present application. The processing path is followed by a transfer mechanism to transfer the work pieces, and a lifting mechanism to lift the work pieces to a return position located above the output level which is located between the transfer mechanism and the return path. The lifting mechanism has a lifting platform which is, for example, vertically adjustable via a lattice grate which is driven through hydraulic or pneumatic cylinders. Here, the return path is preferably inclined between the return position and the loading side such that the processed work pieces are transported back to the loading side by gravity.

This solution has the advantage that the space above the processing device which was not used previously, is now used to return the work pieces. The space required for the return mechanism is greatly reduced and a closely spaced positioning of the processing units in the manufacturing plant is possible. In addition, the return mechanism may directly be attached to already existing processing units. Since the return path runs above the processing path, chips arising during processing will not so easily accumulate on the return path, so that, in addition, the return path will need less service.

If a high throughput is to be achieved during processing, the design of the return mechanism and the required synchronization between processing unit and return mechanism is relatively complicated.

SUMMARY OF THE INVENTION

It is therefore the object of the present invention, to improve the known return mechanism comprising return path and lifting mechanism with lifting platform arranged above the processing path such that the cycle performance can be increased without a great deal of controlling and the lifting motion harmonized.

The solution of this technical problem consists in that the lifting mechanism has a crank drive, by means of which the lifting platform can be raised and lowered.

This provides for driving the lifting platform in a simpler manner using a conventional driving motor. The crank drive provides for a conversion of the rotation into a translational motion. Based on this continuous conversion of the rotation into a lifting motion, no complicated electronic equipment for transporting the work pieces is required to synchronize the lifting mechanism with the work pieces coming from the processing unit in order to increase the passage velocity.

Since the lifting movement of the lifting platform is generated by means of the crank drive, a smooth starting of the lifting mechanism is advantageously created preventing thereby that the work pieces, which lie on the lifting platform, are shifted because of their vis inertiae or, even, fall down therefrom. Following this smooth starting, the lifting motion is accelerated and, thus, a high transport velocity of the work pieces is achieved in order to achieve a sufficiently high cycle performance of the return mechanism. Thereupon, at the end of the lifting motion, the speed of work pieces is smoothly reduced by braking in order to safely transfer them to the return mechanism.

Thus, the crank drive assures a smooth starting with a high transport speed followed by a smooth subsequent reduction of speed of the work pieces lying on the platform, without complicated electric, pneumatic or hydraulic controlling being necessary. Hence, a particularly advantageous transport profile is achieved for the work pieces by simple means by the crank drive, with the course of the speed of the work pieces corresponding to the sine or cosine function by the conversion of the rotation into a translational motion.

Advantageous developments of the return mechanism according to the invention are described in the further claims.

According to an advantageous embodiment, the crank drive has a driven rotational axis with a crank being attached thereto. Therein, the lifting mechanism preferably has a travelling rail coupled with the lifting platform, in which the free end of the crank is guided and which is connected with the lifting platform. The lifting motion of the travelling rail is guided by means of at least one guiding rail. Thus, the path of the lifting platform is defined by the guided travelling rail, so that the work pieces are transported via a defined path from the transfer mechanism to a predetermined return position at the return mechanism.

The at least one guiding rail may run vertically or may be inclined relative to the vertical line. According to a particularly advantageous embodiment of the invention, the inclination of the guiding rail is adjustable relative to the vertical line. The adjustment is carried out by means of an actuating device which may be actuated mechanically, electrically, hydraulically or pneumatically. This allows the return mechanism according to the invention to be adaptable to different processing units in that the guiding rail is inclined to such an extent each that the lifting platform may be passed by in front of the processing unit and the return path runs along in front of the existing processing unit.

The travelling rail preferably has hardened ridges to receive the free ends of the crank which are in particular glued-in. By this measure, the abrasion between the moving parts is reduced in order to increase the life of the device. Gluing facilitates the assembly of the ridges into the travelling rail.

The free end of the crank has advantageously a roller which may be moved in the travelling rail in longitudinal direction. By this measure, the abrasion between the end of the crank and the travelling rail is reduced, so that the efficiency of the device is increased.

Rotatable transport rollers are preferably attached to the lifting platform, the rotation axes of which are arranged essentially vertically to the transport direction of the work piece. A work piece which has been transferred from the transfer mechanism to the lifting platform runs on these transport rollers to a suitable position on the lifting platform. The transport rollers may be driven in order to transport the work piece to this suitable position and in particular start the transfer of the work piece from the lifting table to the return mechanism upon completion of the lifting procedure.

In addition, it is advantageous if the crank drive is synchronized with the processing unit, which allows to further increase the cycle performance of the device, since the passage of the work pieces from the processing unit to the transfer unit and, thereupon, to the lifting platform and the return path is coordinated with each other.

The return mechanism preferably has a return path to return the work pieces from the lifting table to the loading side of the processing unit. In a preferred embodiment, the return path is inclined relatively to the horizontal line between the return position and the loading side such that the work pieces are transported back to the processing unit by gravity. In this embodiment, no additional drive is necessary to transport the work pieces back from the lifting platform to the loading side. Here, rotatable transport rollers are preferably attached to the return path, the rotation axes of which are disposed essentially vertically relative to the transport direction of the work piece.

Finally, it is also conceivable to provide the return path with a driven transport path to return the work pieces from the lifting platform to the loading side.

SHORT DESCRIPTION OF THE DRAWINGS

Figure 7:
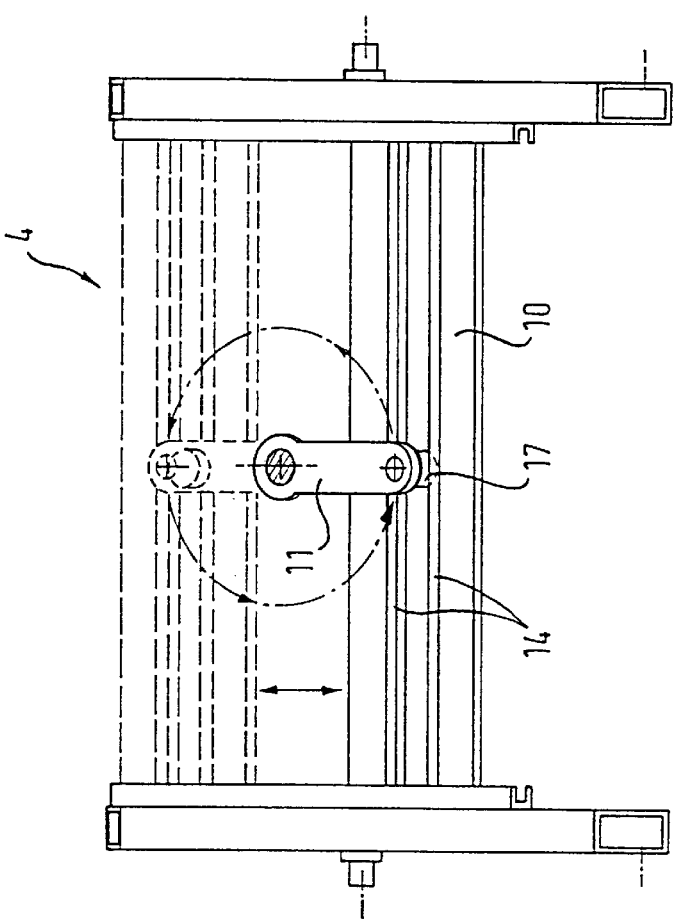
Figure 6:
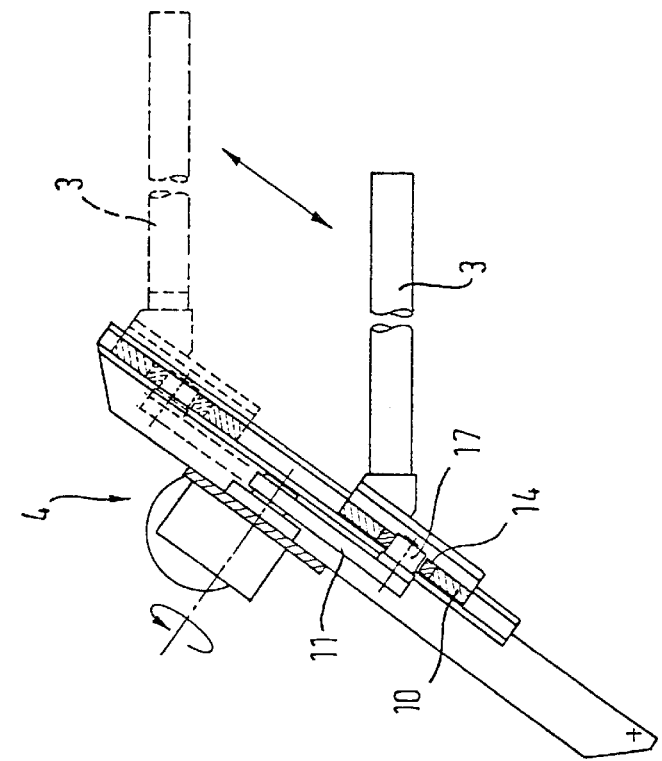

In the following an embodiment of the mechanism for returning processed work pieces according to the invention is described by way of example by means of drawings, wherein in detail shows:

FIG. 1 a diagrammatic side view of a mechanism according to the invention,

FIG. 2 a diagrammatic rear view of a mechanism according to the invention,

FIG. 3 a side view of a mechanism according to the invention,

FIG. 4 a rear view of a mechanism according to the invention,

FIG. 5 a crank drive of a mechanism according to the invention in four different positions, FIG. 6 a side view of a crank drive of a mechanism according to the invention, and FIG. 7 a rear view of a crank drive of a mechanism according to the invention.

DETAILED DESCRIPTION OF A PREFERRED EMBODIMENT

FIGS. 1 to 4 show a preferred embodiment of the mechanism of the invention for returning processed work pieces, with the mechanism being shown in FIGS. 1 and 3 as a side view and in FIGS. 2 and 4 as a rear view.

The mechanism according to the invention is attached to an already existing processing unit (not shown), for example, to an edge attachment device for pressing-in bridge edges into the edges of wooden work pieces having the form of plates. The work pieces 7 (FIG. 4) pass from the processing unit into a transfer mechanism 1 (in FIGS. 1 and 3: into the plane of the drawing, and in FIGS. 2 and 4: to the left) and are then lifted by means of a lifting mechanism with a lifting platform 3 to a return mechanism 2 which transports the work pieces 7 back to the loading side of the processing unit (in FIGS. 1 and 3: out of the plane of the drawing, and in FIGS. 2 and 4: to the right).

The lifting mechanism according to the invention has a crank drive 4 by means of which the lifting platform 3, which will be described in more detail in the following, may be raised and lowered.

From FIG. 2 may be taken that the return unit 2 in this embodiment has a return path 9 between the return position and the loading side is inclined relative to the horizontal line such that the work pieces are returned by gravity to the loading side of the processing unit. The transfer mechanism 1 as well as the return path 9 have rotatable transport rollers 5 or 6, respectively, the rotation axes of which are arranged vertically relative to the transport direction.

FIG. 3 shows two positions of the lifting platform 3 which is also provided with rotatable transport rollers 8. In the base position, shown in FIG. 3 by continuous lines, a work piece can run onto the lifting platform 3. The lifting platform 3 is subsequently lifted by means of the crank drive 4 in the position shown with dashed lines to the level of the return path 9, so that the work piece can be transferred from the lifting platform 3 to the return path 9 and runs back on the return path 9 to the loading side. From FIG. 3 may further be taken that the guidance of the lifting platform 3 is inclined relative to the vertical line, with the inclination being adjustable by means of an actuating device 15. The adjustability of the inclination of the guidance of the lifting platform 3 serves to render the mechanism of the invention adaptable to different existing processing units: the guidance is inclined each time such as to allow the arrangement of guidance and crank drive 4 to be arranged in an area in which it does not collide with the existing processing unit. A drive device 16 for the crank drive may also be taken from FIG. 3.

FIG. 5 shows the design and mode of operation of the crank drive 4. A crank 11 revolves about a rotation axis 13 which is driven by means of the drive device 16 (FIG. 3). The free end of the crank 11 runs in a travelling rail 10 which in turn is guided by means of two guiding rails 12. The free end of the crank 11 runs in the travelling rail during the rotation motion of the crank 11 and moves the travelling rail 10 such that it performs an up-down motion based on the rotation motion of the crank 11: on the basis of a half turn of the crank 11 in counter-clockwise direction, the lifting platform 3 moves from a base position shown in FIG. 5a/b, in which a work piece can run onto the lifting platform 3, via the intermediate position shown in FIG. 5c/d up to the position shown in FIG. 5e/f, in which the work piece can be transferred to the return mechanism. The travelling rail 10 moves again down during the following half turn of the crank 11 (FIG. 5g/h), so that the lifting platform 3 coupled therewith is again brought into the base position (FIG. 5a/b), in which the next work piece can run onto the lifting platform 3.

Based on the drive of the lifting platform 3 by means of the crank drive 4, an advantageous course of the motion of the lifting platform 3 is guaranteed by the mechanism according to the invention: the starting of the lifting mechanism from the base position (FIG. 5a/b) is performed in a smooth manner, since the crank 11 during starting moves through the lower dead center of the up-down motion of the travelling rail 10. It is prevented thereby that the work piece, which lies on the lifting platform 3, is shifted because of its vis inertiae or, even, falls down therefrom. Following this smooth starting, the travelling rail 10 is continuously accelerated until the position is reached which is shown in FIG. 5c/d in which the crank 11 has turned by 90° as compared with the base position, the highest speed of the travelling rail 19 is reached and, thus, an advantageously high velocity of the work pieces is achieved in order to achieve a sufficiently high cycle performance of the return mechanism. Thereupon, at the end of the lifting motion (rotation angle of the crank 11: 90 to 180° relative to the base position), the lifting platform 3 is smoothly reduced by braking until the upper dead center of the motion of the travelling rail 10 is reached at a rotation angle of the crank 11 of 180° relative to the base position. Then, the lifting platform 3 is in the return position in which the work piece 3 on the lifting platform can be transferred to the return path.

The crank drive 4 may continuously run during this action if the lifting mechanism is synchronized with the processing unit such that a work piece runs onto the lifting platform 3 when the same is in its base position (FIG. 5a/b). In order to achieve this, the speed of the crank drive 4 may be adjusted in a suitable manner or a higher-order control may be provided synchronizing the drive 16 of the crank drive 4 with the processing unit.

Alternatively, the crank drive 4 may be controlled such that it moves the lifting platform 3 from the base position to the return position when a work piece lies on the lifting platform 3. This may be performed by a sensor (not shown) which detects when a work piece arrives the lifting platform 3 and transfers this to a higher-order control means which controls the crank drive 4. When the work piece has moved away from the lifting platform 3, which may also be detected by a sensor, the lifting platform 3 is again returned to the base position by a half turn of the crank 11.

FIGS. 6 and 7 show the crank drive 4 and the lifting platform 3 in detail, with the base position of the lifting platform 3 again being represented by continuous lines and the return position of the lifting platform 3 by dashed lines. Further, it may be taken therefrom that the guide rail 10 has ridges 14 to receive the free end of the crank 11, which are glued in the guide rail 10 and consist of hardened material in order to keep the abrasion of the moving parts as low as possible. Further, the free end of the crank 11 bears a roller 17, which serves to reduce abrasion between the end of the crank and the travelling rail increasing thereby the efficiency of the mechanism.

What is claimed is:

1. Mechanism for returning processed work pieces (7) from the output side to the loading side of a processing unit, which mechanism has a transfer mechanism (1) to transfer the work pieces (7) at the output side of the processing unit, a return mechanism (2) for transporting work pieces (7) delivered by the transfer mechanism (1) back to the loading side of the processing unit or to a further processing unit, and a lifting mechanism to lift the work pieces (7) to a return position located above the output position, whereby the lifting mechanism is located between the transfer mechanism (1) and the return mechanism (2) and has a lifting platform, characterized in that the lifting mechanism having a crank drive (4) by means of which the lifting platform (3) can be raised and lowered.

2. Mechanism according to claim 1, characterized in that the crank drive (4) has a driven rotational axis (13) with a crank (11) being attached thereto.

3. Mechanism according to claim 2, characterized in that the lifting mechanism has a travelling rail (10) coupled with the lifting platform (3), in which the free end of the crank (11) is guided and which is connected with the lifting platform (3), with the lifting movement of the travelling rail (10) being guided by means of at least one guiding rail (12).

4. Mechanism according to claim 3, characterized in that the at least one guiding rail (12) runs vertically.

5. Mechanism according to claim 3, characterized in that the at least one guiding rail (12) is inclined relative to the vertical line.

6. Mechanism according to one of claims 3 to 5, characterized in that the inclination of the at least one guiding rail (12) is adjustable.

7. Mechanism according to claim 6, characterized in that a mechanically, electrically, hydraulically or pneumatically actuable actuating device (15) is provided for adjusting the inclination of the at least one guiding rail (12).

8. Mechanism according to claim 3, characterized in that the travelling rail (10) has hardened ridges (14) for receiving the free end of the crank (11), which are particularly glued in place.

9. Mechanism according to claim 3, characterized in that the free end of the crank (11) carries a roll (17) which is moveable in the longitudinal direction of the travelling rail (10).

10. Mechanism according to claim 1, characterized in that rotatable transport rolls (8) are arranged at the lifting platform (3), the rotation axes of which are arranged essentially vertically to the transport direction of the work piece (7).

11. Mechanisms according to claim 10, characterized in that the transport rolls (8) are driven.

12. Mechanism according to claim 1, characterized in that the crank drive (4) is synchronized with at least one processing unit.

13. Mechanism according to claim 1, characterized in that the return mechanism (2) comprises a return path (9).

14. Mechanism according to claim 13, characterized in that the return path (9) is inclined relative to the horizontal line between the return position and the loading side or the further processing unit such that the work pieces (7) are returned by gravity to the loading side of the processing unit or to the further processing unit.

15. Mechanism according to claim 13 or 14, characterized in that rotatable transport rolls (6) are arranged at the return path (9), the rotation axes of which are positioned essentially vertically relative to the transport direction of the work piece (7).

16. Mechanism according to claim 13, characterized in that the return path (9) has a driven conveying belt.

\* \* \* \* \*